US007668458B2

(12) United States Patent
Knightlinger

(10) Patent No.: US 7,668,458 B2
(45) Date of Patent: Feb. 23, 2010

(54) PROTECTION DEVICE FOR PHOTOGRAPHIC APPARATUS

(76) Inventor: Thomas D Knightlinger, 2221 Shepard School Rd., Zebulon, NC (US) 27597

( * ) Notice: Subject to any disclaimer, the term of this patent is extended or adjusted under 35 U.S.C. 154(b) by 364 days.

(21) Appl. No.: 11/308,005

(22) Filed: Mar. 2, 2006

(65) Prior Publication Data
US 2006/0198628 A1 Sep. 7, 2006

Related U.S. Application Data

(60) Provisional application No. 60/657,987, filed on Mar. 2, 2005.

(51) Int. Cl.
*G03B 29/00* (2006.01)
(52) U.S. Cl. .......................... 396/429; 135/16
(58) Field of Classification Search ......... 396/419–422, 396/428, 544, 429; 135/16; D16/237, 242, D16/243; 248/298.1
See application file for complete search history.

(56) References Cited

U.S. PATENT DOCUMENTS

| | | | | | |
|---|---|---|---|---|---|
| 3,148,851 | A | * | 9/1964 | Condon | 248/515 |
| 3,269,289 | A | * | 8/1966 | Ginter | 396/544 |
| 3,731,897 | A | * | 5/1973 | Price | 248/230.1 |
| 3,851,164 | A | * | 11/1974 | Intrator | 362/7 |
| 4,752,794 | A | * | 6/1988 | Bohannon | 396/189 |
| 5,251,860 | A | * | 10/1993 | Nystrom | 248/313 |
| D370,336 | S | * | 6/1996 | Rosier | D3/5 |
| 5,743,283 | A | * | 4/1998 | Horvath | 135/16 |
| 6,979,137 | B1 | * | 12/2005 | Saliaris | 396/422 |

* cited by examiner

*Primary Examiner*—W. B. Perkey
(74) *Attorney, Agent, or Firm*—Patwrite LLC; Mark David Torche

(57) ABSTRACT

A protective device for photographic apparatus comprises an umbrella with a shaft which slides in a ball joint having a compressible o-ring that fits inside a groove within the ball joint. The ball joint is held in place with compression screws joining two halves of a collar system which are adjusted to provide the desired frictional setting to maintain the umbrella in the desired position. A slide bar with an attachment bolt at one end and a stop at the other is used to attach the present invention to the base of a camera or video device and provides the slide wherein the collar system is moved to a desired position. The collar system includes grooves whereby the shaft of the umbrella may be rotated to lie flat against the collar system to facilitate storage and tilting of the photographic apparatus. The umbrella collapses pulling the protective canopy down along shaft for easy storage.

4 Claims, 4 Drawing Sheets

PROTECTION DEVICE FOR PHOTOGRAPHIC APPARATUS

RELATED APPLICATIONS

This application claims priority and herein incorporates by reference U.S. provisional patent application No. 60/657,987, filed Mar. 2, 2005.

BACKGROUND OF THE INVENTION

Almost as soon as cameras were invented, people wanted to take them outside and record the world around them. Of course, it was soon apparent that nature was not always cooperative. In the case of inclement weather, some photographers went to great measures to keep rain or snow off their expensive equipment. If water splashes on the lens, the picture was often unusable. Even on good days, the photographer could often be seen using all kind of hand gestures to attempt to shade the viewfinder from the sun.

The digital revolution has changed much about the way photography is practiced, but the same old problems plaque digital cameras and recorders as was common to the traditional film medium, in fact the ubiquitous LCD screen that has replaced viewfinders is often more affected by rain or bright glare. Some users have resorted to placing bags or towels over their equipment, but these solutions do not allow the user to operate the device and still protect it from the elements. Lens caps protect the lenses, but must be removed or opened during use. Cameras can be placed in plastic covers such as the type used for underwater photography, but these covers are expensive and do not prevent drops from appearing on captured images nor do they do anything to reduce glare.

There is a need for an inexpensive and portable device to protect and shade photographic apparatus.

SUMMARY OF THE INVENTION

A protective device for photographic apparatus comprises an umbrella with a shaft which slides in a ball joint having a compressible o-ring that fits inside a groove within the ball joint. The ball joint is held in place with compression screws joining two halves of a collar system which are adjusted to provide the desired frictional setting to maintain the umbrella in the desired position. A slide bar with an attachment bolt at one end and a stop at the other is used to attach the present invention to the base of a camera or video device and provides the slide wherein the collar system is moved to a desired position. The collar system includes grooves whereby the shaft of the umbrella may be rotated to lie flat against the collar system to facilitate storage and tilting of the photographic apparatus. The umbrella collapses pulling the protective canopy down along shaft for easy storage.

Other features and advantages of the instant invention will become apparent from the following description of the invention which refers to the accompanying drawings.

DETAILED DESCRIPTION OF THE INVENTION

Figure 1:
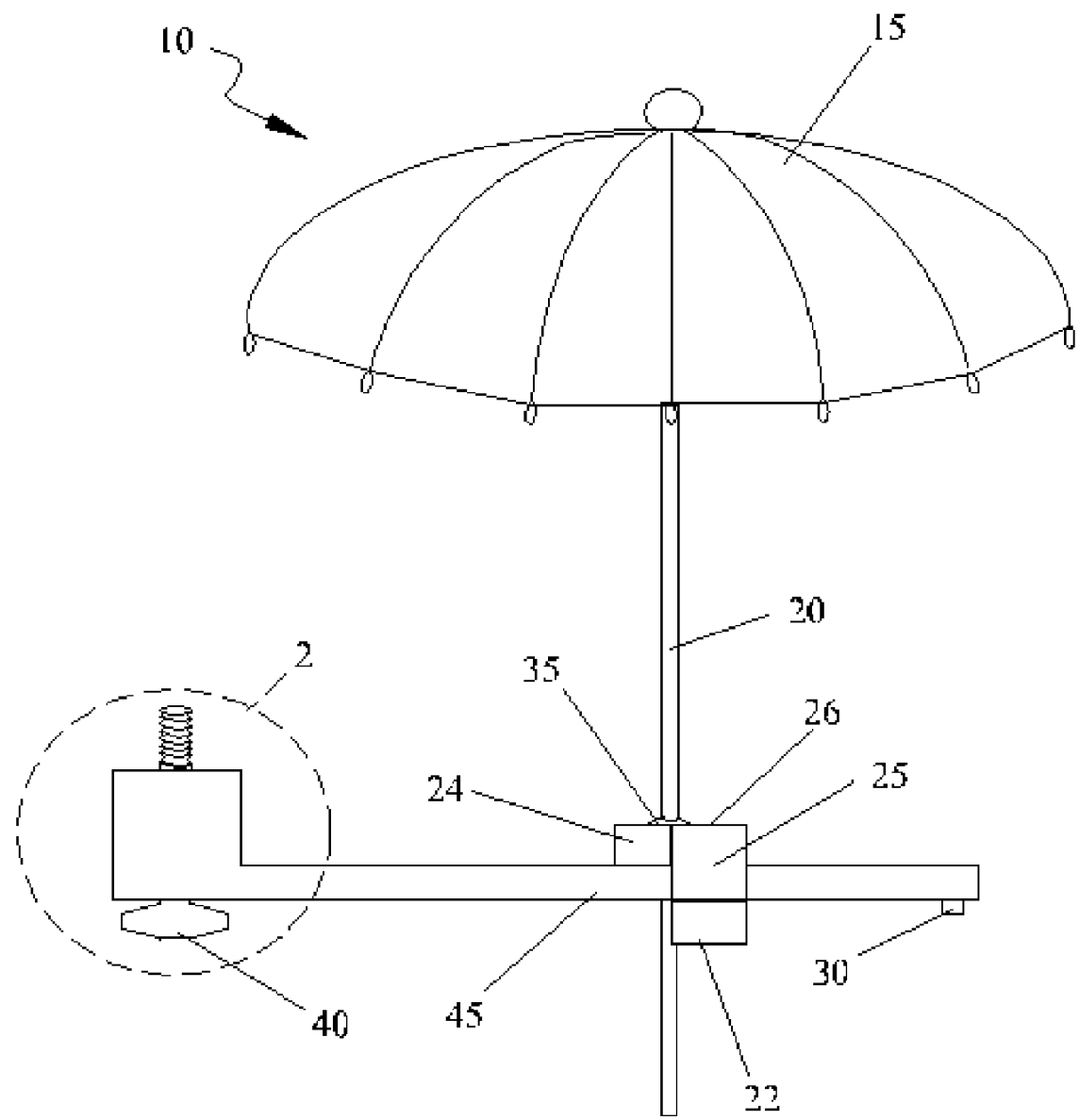
FIG. 1 is a side view of an embodiment of the present invention.

Reference is now made to the drawings in which reference numerals refer to like elements.

FIG. 1 shows an embodiment of the present invention shown generally as 10 having an umbrella 15 with a shaft 20. Shaft 20 fits inside a ball joint 35 which is in turn collared within two sides of a collar system 24, 25 which is connected to slider 22 and together make up slide arm 26. A slide bar 45 attaches to the bottom of a camera or any photographic apparatus using the connecting bolt 40 as is known in the art. A stop 30 is provided to prevent slide arm 26 from sliding off the end of slide bar 45.

Figure 2:
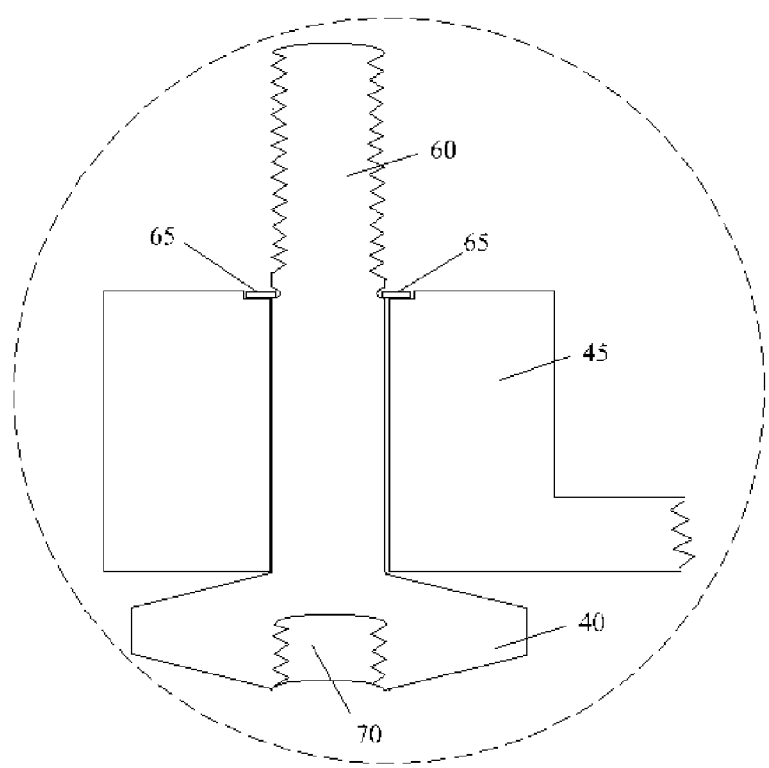
FIG. 2 is an enlarged view of a portion appearing in FIG. 1.

FIG. 2 details the attachment bolt 40 and shows a clip 65 that retains attachment bolt 40 within sliding bar 40. Attachment bolt 40 is threaded 60 with a standard thread that is used in all photographic apparatus to attach to a tripod. In another embodiment, attachment bolt 40 also has female threads 70 provided to allow attachment to photographic apparatus and tripod simultaneously.

Figure 3:
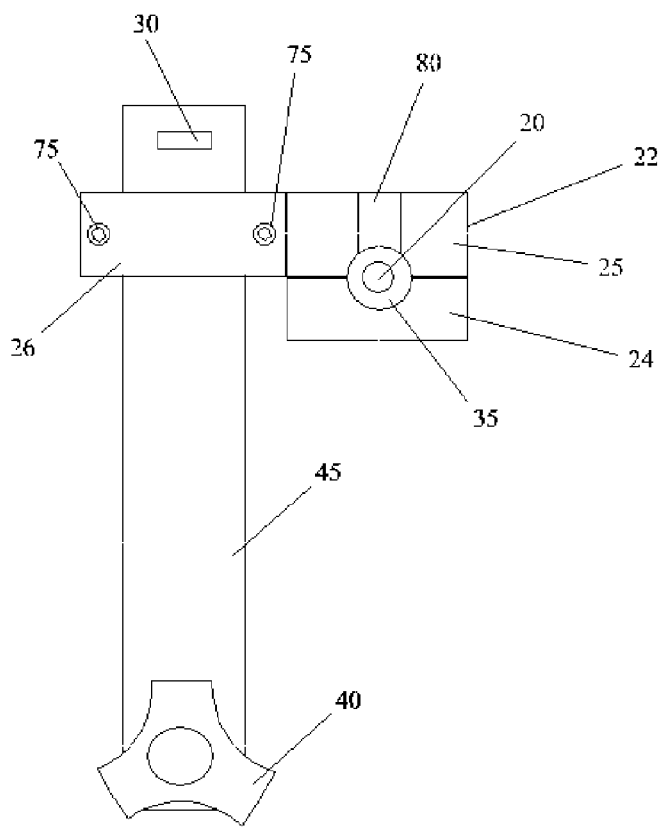
FIG. 3 is a bottom view of an embodiment of the present invention.

FIG. 3 details a bottom view of an embodiment of the present invention showing slide arm 26 having two compression screws 75 provided to adjust the level of friction as sliding arm 26 slides along slide bar 45. Other compression means would be suitable as is known in the art. A groove 80 is provided to allow umbrella shaft 20 to rotate 90 degrees and lie in groove 80 when in a storage or when the present invention is operated in a sideward orientation.

Figure 4:
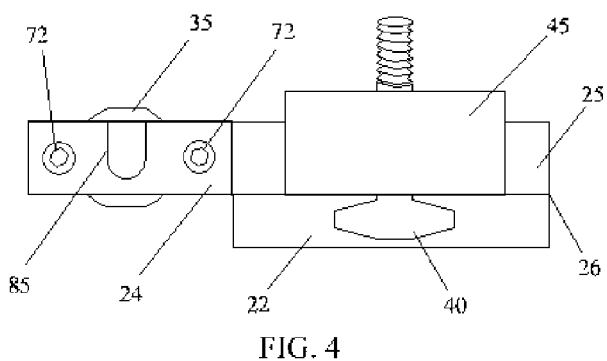
FIG. 4 is a side view of an embodiment of the present invention.

Now referring to FIG. 4, slide arm 26 is shown from the side and top groove 85 is shown providing 90 degree rotation of umbrella shaft 20 as discussed above. Compression screws 72 provide friction fit for ball socket 35 proving for adjustment in the force required to rotate umbrella shaft 20.

Figure 5:
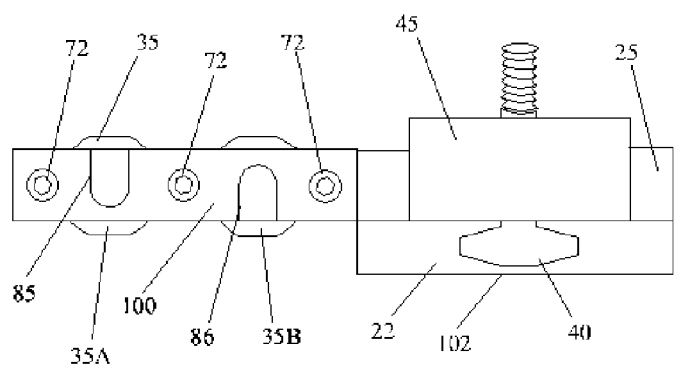
FIG. 5 is a side view of another embodiment of the present invention.

FIG. 5 is a two ball socket embodiment that allows umbrella 15 to be positioned in either ball socket 35A or 35B. This allows 180 degrees of rotation with 90 provided in opposite directions depending on which ball socket is selected. Groove 86 is on the opposite side as groove 85 to provide the difference in rotation. Compression screws 72 are provided to adjust friction fit of ball sockets 35A and 35B.

Figure 6:
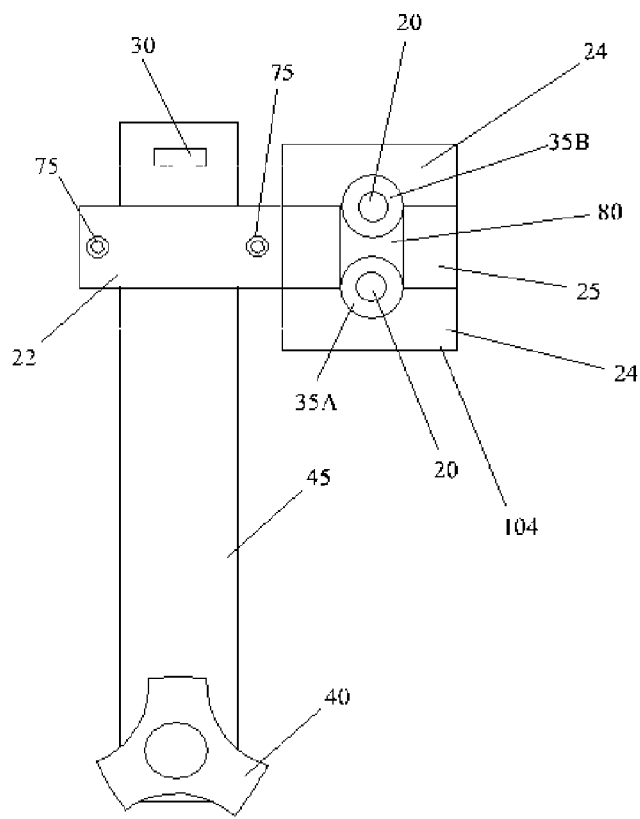
FIG. 6 is a bottom view of yet another embodiment of the present invention.

FIG. 6 illustrates yet another two ball socket embodiment with ball socket 35A and 35B disposed on either side slide arm component 25. A single groove 80 is provided on the bottom along with grooves on the top (not shown) to allow 180 degrees of rotation in 90 degree movements depending on which ball socket is selected. In this embodiment, shaft 20 must not extend past the ball sockets in a rotated orientation. Of course a wider slide arm component 25 would allow for some extension.

Figure 7:
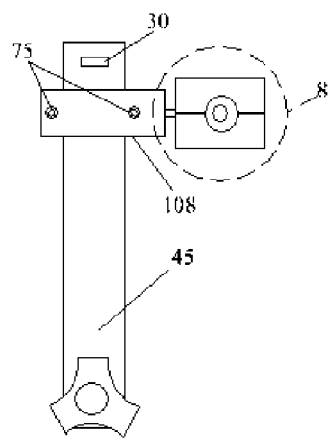
FIG. 7 is a bottom view of a further embodiment of the present invention.
Figure 8:
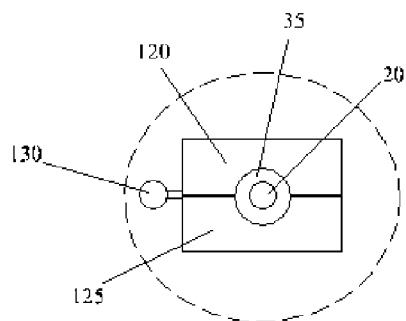
FIG. 8 is an enlarged view of a portion appearing in FIG. 7.

FIGS. 7 and 8 illustrate a ball and socket joint 130 embodiment of the present invention. In this embodiment ball joint 130 fits in a ball joint (not shown) provided in slide arm component 108. Slide arm components 120 and 125 do not require grooves in this embodiment and 360 degrees of rotation is provided. The resistance of the ball and socket joint 130 is provided by resistance screws 75.

Figure 9:
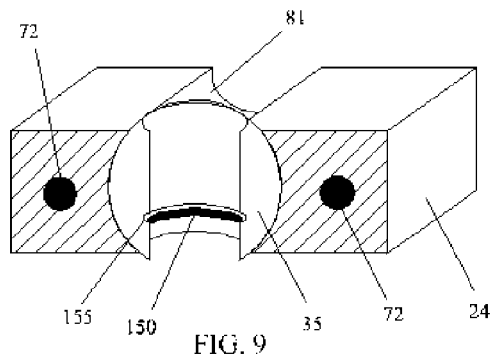
FIG. 9 is a cut-away perspective view an embodiment of the collar system and ball joint according to the present invention.

FIG. 9 is a perspective cutaway view of the detail of ball socket 35 and shows o-ring 150 fitted within groove 155 of ball socket 35. Ball socket 35 is made of plastic but any suitable material such as metal, Teflon® or other polymer would be suitable as is known in the art. Additionally, if adjustability is not important, umbrella 15 and shaft 20 could be permanently mounted within slide arm 26 and would function to protect the photographic apparatus.

Figure 10:
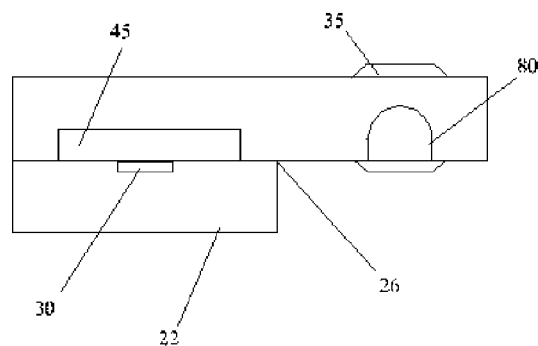
FIG. 10 is a end view of an embodiment according to the present invention.

FIG. 10 is an end view showing slide arm 26 sliding along slide bar 45. Stop 30 prevents slide arm 26 from sliding completely off slide bar 45.

Although the instant invention has been described in relation to particular embodiments thereof, many other variations and modifications and other uses will become apparent to those skilled in the art.

What is claimed is:

1. A protective device for photographic apparatus comprising:
   a slide bar;
   said slide bar having an attachment member on an end;
   a slide arm slidably connected to said slide bar wherein a user can position said slide arm along a substantial portion of said slide bar;
   at least one pivot socket proximally disposed within said slide arm wherein said at least one pivot socket is free to pivot at least 90 degrees;
   a protective member having a shaft substantially perpendicular to said protective member;
   said protective member being disposed at an end of said shaft;
   said shaft removably fitting within said at least one pivot socket wherein said shaft slides within said at least one pivot socket; and
   an o-ring compressibly disposed within a channel on an inside diameter of said at least one pivot socket.

2. A protective device for photographic apparatus comprising:
   a slide bar;
   said slide bar having an attachment member on an end;
   a slide arm slidably connected to said slide bar wherein a user can position said slide arm along a substantial portion of said slide bar;
   at least one pivot socket proximally disposed within said slide arm wherein said at least one pivot socket is free to pivot at least 90 degrees;
   a protective member having a shaft substantially perpendicular to said protective member;
   said protective member being disposed at an end of said shaft, wherein said protective member is an umbrella;
   said shaft removably fitting within said at least one pivot socket wherein said shaft slides within said at least one pivot socket
   a ball socket;
   said slide arm having a top sliding portion and a bottom sliding portion; and
   a tightening mechanism connecting said top and bottom sliding portions whereby when tightened, said slide arm frictionally engages with said slide bar.

3. The protective device for photographic apparatus according to claim 2 further comprising an o-ring compressibly disposed within an inner diameter of said ball socket wherein said shaft frictionally engages with said o-ring providing height control for said umbrella.

4. The protective device for photographic apparatus according to claim 3 wherein said top and bottom sliding portions have a slot on opposite sides therein wherein said ball socket and shaft cooperatively rotate to an extreme position resting within said slots whereby said shaft and said umbrella rotate at least 90 degrees.

\* \* \* \* \*